US007529785B1

(12) United States Patent
Spertus et al.

(10) Patent No.: US 7,529,785 B1
(45) Date of Patent: May 5, 2009

(54) EFFICIENT BACKUPS USING DYNAMICALLY SHARED STORAGE POOLS IN PEER-TO-PEER NETWORKS

(75) Inventors: Michael P. Spertus, Chicago, IL (US); Slava Kritov, Palo Alto, CA (US); Darrell M. Kienzle, Vienna, VA (US); Hans F. van Rietschote, Sunnyvale, CA (US); Anthony T. Orling, San Luis Obispo, CA (US); William E. Sobel, Stevenson Ranch, CA (US)

(73) Assignee: Symantec Corporation, Cupertino, CA (US)

( * ) Notice: Subject to any disclaimer, the term of this patent is extended or adjusted under 35 U.S.C. 154(b) by 269 days.

(21) Appl. No.: 11/363,780

(22) Filed: Feb. 28, 2006

(51) Int. Cl.
*G06F 17/30* (2006.01)
(52) U.S. Cl. .................. 707/204; 707/203; 707/200
(58) Field of Classification Search .............. 707/10, 707/203–205
See application file for complete search history.

(56) References Cited

U.S. PATENT DOCUMENTS 6,928,476 B2 * 8/2005 Bucher ..................... 709/225
7,092,977 B2 * 8/2006 Leung et al. ............... 707/205

OTHER PUBLICATIONS

"Glacier: Highly Durable, Decentralized Storage Despite Massive Correlated Failures"; Haeberlen, et al; 2004 IRIS Student Workshop, Cambridge, MA, Nov. 7, 2004.

"Maintaining Object Ordering in a Shared P2P Storage Environment"; Caronni, et al; Whitepaper; Sun Microsystems, Inc.; Sep. 2004.

"Mirra Personal Server M-250"; Review; PCMag.com; Aug. 17, 2005.

"Scalable, Structured Data Placement Over P2P Storage Utilities"; Proceedings of the 10th IEEE International Workshop on Future Trends of Distributed Computing Systems (FTDCS'04)—vol. 00; 2004.

Weatherspoon, Hakim and John D. Kubiatowicz; Erasure Coding vs. Replication: A Quantitative Comparison; Paper; 2002; Internet; University of California, Berkley; http://www.cs.rice.edu/Conferences/IPTPS02/170.pdf.

Maymounkov, Petar and David Mazieres; "Kademlia: A Peer-to-peer Information System Based on the XOR Metric"; Paper; 2002; Internet; New York University; http://www.cs.rice.edu/Conferences/IPTPS02/170.pdf.

* cited by examiner

*Primary Examiner*—Yicun Wu
(74) *Attorney, Agent, or Firm*—Meyertons Hood Kivlin Kowert & Goetzel, P.C.; Jason L. Burgess (57) ABSTRACT

A system for efficient backups using dynamically shared storage pools in peer-to-peer networks comprises one or more processors and memory coupled to the processors. The memory stores instructions executable by the processors to implement a backup manager configured to dynamically subdivide a storage pool into one or more portions of storage currently designated for local backup data and one or more portions of storage currently designated for peer-to-peer (P2P) backup data. In response to local backup data received from a backup client, the backup manager may store the local backup data in a portion of the storage pool that is currently designated for local backup data. The backup manager may then generate a P2P version of the local backup data, e.g., by encrypting and/or redundancy encoding the local backup data, and transmit parts of the P2P version to each of one or more peer devices in the P2P network.

26 Claims, 7 Drawing Sheets

EFFICIENT BACKUPS USING DYNAMICALLY SHARED STORAGE POOLS IN PEER-TO-PEER NETWORKS

BACKGROUND OF THE INVENTION

1. Field of the Invention

This invention relates to computer systems and, more particularly, to backup management in distributed computer systems.

2. Description of the Related Art

Today's enterprise environments typically comprise a wide variety of computing devices with varying processing and storage resources, ranging from powerful clusters of multi-processor servers to desktop systems, laptops, and relatively low-power personal digital assistants, intelligent mobile phones and the like. Most or all of these devices are often linked, at least from time to time, to one or more networks such as the Internet, corporate intranets, departmental or campus local area networks (LANs), home-based LANs, etc. Furthermore, most or all of these devices often store data, at least temporarily, that if lost or corrupted may lead to considerable rework and/or to lost business opportunities. While perhaps not as important from a business perspective, the loss or corruption of personal data such as photographs, financial documents, etc., from home computers and other devices outside corporate boundaries may also have unpleasant consequences. Backing up the data locally, e.g., to devices stored at the same building or site as the source data, is typically not sufficient, especially in the event of catastrophic events such as hurricanes, tornados, floods, fires and the like. Furthermore, while local backups may be relatively fast, in aggregate they often result in multiple copies of the same files being backed up: for example, even though many of the operating system files in one backup client system may be identical to operating system files in another backup client system, local backups initiated from each of the clients may typically store independent backup versions of the data from each client separately, including duplicate backed-up copies of the identical files.

In order to enable recovery from localized catastrophic events, various techniques for backup to remote sites have been developed over the years. Many traditional disaster recovery techniques are often centrally controlled and expensive, however, and are therefore typically limited to protecting the most important, mission-critical subsets of business data. In recent years, in order to take advantage of the widening availability of Internet access and the mass availability of cheap storage, peer-to-peer (P2P) backup management techniques have been proposed. In such P2P backup management environments, for example, each participating device may be allowed to back up data objects such as files into a P2P network or "cloud" (a large distributed network, such as hundreds or thousands of hosts connected to the Internet). In the event of a failure at the source device (the device from which the data objects were uploaded), the backed up data may be retrieved from the P2P cloud. P2P backup management software may be installed at the participating devices to enable discovery of target devices to store backup data, to schedule and perform the P2P backups, to search for previously backed-up data within the P2P cloud, and to retrieve backup data from other devices of the P2P cloud as needed. Often, few restrictions are placed on devices for membership in P2P networks: e.g., even a home personal computer that is only powered on for a few hours a day may be allowed to participate in a P2P network.

Unfortunately, the amount of source data to be backed up can be quite large—for example, if conventional P2P techniques are used, several gigabytes of data may have to be backed up from a single laptop computer in order to be able to support full recovery from a disk crash or other failures at the laptop. Furthermore, the total amount of data uploaded into the P2P network for a backup of a given source data set is often substantially greater than the size of the source data itself. This data expansion may be required because few guarantees can usually be provided regarding the availability of any given device in the P2P network. If, in a naïve implementation of P2P backup management, an important file was backed to only one or two target devices of the P2P network from a source device, it is quite possible that none of the target devices that store the file may be online or available when the file has to be recovered. Source data to be backed up is therefore typically encoded for error correction (e.g., using an erasure code) and/or replicated at the source device prior to uploading to several targets in the P2P cloud, so that the probability of being able to recover the source data is increased. (In general, an erasure code transforms a data object containing n blocks into a data object with m blocks, where m is large than n, such that the original data object can be recovered from a subset of those m blocks.) The expansion of the source data set to increase availability of the backed-up version further adds to the upload bandwidth requirements from the source devices. Since many of the devices whose data is to be backed up into the P2P network often have intermittent connectivity to the P2P network, and may be provided relatively low upload bandwidth when they do have access to the P2P network, it may be difficult for such devices to successfully perform complete backups into the P2P network. Furthermore, some existing P2P backup techniques may require participating devices to reserve substantial amounts of storage (often several times larger than the expected amount of data to be backed up from the device) for incoming P2P backup data, which may also place an undue storage burden on the devices.

SUMMARY

Various embodiments of systems and methods for efficient backups using dynamically shared storage pools in peer-to-peer networks are disclosed. According to one embodiment, a system comprises one or more processors and memory coupled to the processors. The memory stores program instructions executable by the processors to implement a backup manager configured to dynamically subdivide a storage pool into one or more portions of storage currently designated for local backup data and one or more portions of storage currently designated for peer-to-peer (P2P) backup data. The backup manager may be incorporated within a variety of different types of devices of a P2P network in various embodiments, such as computer servers selected for high levels of availability and connectivity, gateways, routers, firewalls, network attached storage (NAS) appliances, etc. Each backup manager may be configured to coordinate a distributed backup technique for one or more backup client devices (such as laptops, personal computers, etc.). In response to local backup data received, for example, over a LAN from a backup client device, the backup manager may store the local backup data in a first portion of the storage pool that is currently designated for local backup data. The backup manager may then generate a P2P version of the local backup data, e.g., by encrypting and/or producing error-correcting encodings or replicas of the local backup data. At least a portion of the P2P version of the local backup data may then be transmitted from the backup manager to each of one or more peer devices in the P2P network such as selected remote backup managers. By generating and transmitting the P2P version into the P2P network on behalf of the client, the backup manager may enable disaster recovery for the client's data while eliminating some of the processing, storage and/or networking burden that the client may otherwise have had to bear. By intelligently sharing the storage pool among backup data objects for a variety of local and remote clients and eliminating redundant backup objects as described below, the backup manager may also reduce the overall storage required for backups in some embodiments.

In addition to storing local backup data for one or more backup clients, a given backup manager may be configured to receive P2P backup data generated by other backup managers in the P2P network, and to store the incoming P2P data in portions of the storage pool currently designated to store P2P data. The data blocks comprising the storage pool may be dynamically retargeted to store incoming local and/or P2P backup data: e.g., blocks that were storing local backup data may be reallocated to store incoming P2P backup data, and blocks that were storing P2P backup data may be reallocated to store incoming local backup data, as needed. Blocks may also be dynamically reclaimed and reallocated as needed between portions of the storage pool that store respective clients' local backup data in some implementations: e.g., blocks of data storing client A's local backup data may be reused for storing client B's local backup data. In some embodiments, the transmission of the P2P version of local backup data for a given client may be performed asynchronously with respect to the local backup. E.g., the client may be informed that the backup is complete as soon as its local backup data reaches the storage pool, and the generation and dissemination of the P2P version may be delayed until later and/or performed as a low-priority or background activity. In one implementation, one or more blocks storing local backup data for a given client's backup may be reallocated to other purposes even before the P2P backup phase for that client has been completed.

In one embodiment, a backup manager may be configured to reduce the aggregate amount of data that has to be transmitted from a client for backup. For example, the client may specify a source data set comprising a plurality of data objects such as files to be backed up. The backup manager may be configured to determine whether a restorable version of a particular file is already accessible, e.g., from the P2P network, where it may have for example been stored earlier on behalf of some other client. For example, restorable versions of operating system files that are shared by many clients may already be available from one or more peer backup managers. If such a restorable version is found, the backup manager may exclude the particular file from the data that is stored in the storage pool or injected into the P2P network, thus further reducing the time and resources needed to complete the backup from the client's perspective.

According to another embodiment, a system may comprise a backup manager having access to a P2P network, and one or more backup clients. The backup manager may be configured to dynamically subdivide a storage pool into one or more portions of storage currently designated for local backup data from the one or more backup clients, and one or more portions of storage currently designated for P2P backup data received from the P2P network. In response to receiving local backup data from a particular backup client of the one or more backup clients, the backup manager may be configured to store the local backup data in a first portion of the storage pool currently designated for local backup data, and to transmit at least a portion of a P2P version of the local backup data to each of one or more peer devices in the P2P network.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
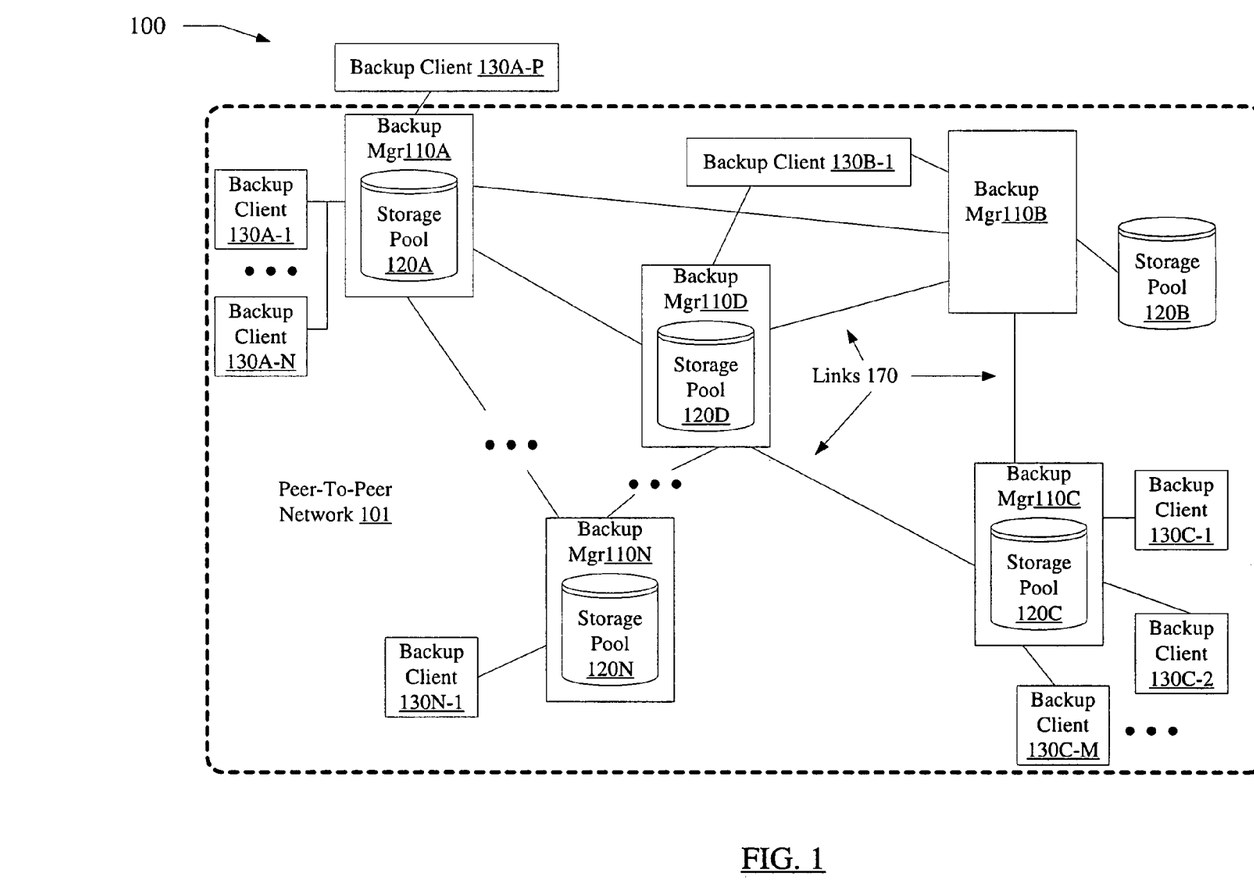
FIG. 1 is a block diagram illustrating one embodiment of a system.

FIG. 1 is a block diagram illustrating a system 100 according to one embodiment. As shown, system 100 includes a plurality of backup managers 110 (e.g., backup managers 110A-110N) and a plurality of backup clients 130 (e.g., backup clients 130A-1-130A-N, 130A-P, 130B-1, 130C-1-130C-M, and 130N-1). At any given point of time, at least some of the backup managers 110 and at least some of the backup clients 130 may be linked to one another via links such as links 170 of network 101 in a peer-to-peer (P2P) configuration to implement an efficient distributed backup technique described below in further detail. For example, at the point of time illustrated in the exemplary configuration illustrated in FIG. 1, all the backup managers shown, and all the backup clients shown except backup client 130A-P, form part of the peer-to-peer network. The set of devices in the P2P network (such as backup managers 110 and backup clients 130) may collectively be termed "peer devices" or "P2P devices" herein, and the peer devices together with their connecting links 170 may be termed a "P2P cloud" herein. The devices 110 and 130 may typically be spread over a large number, such as hundreds or thousands, of physical locations; for example, the P2P cloud may in one embodiment comprise portions of the Internet, allowing relatively autonomous devices geographically distributed across several continents to collaborate as desired on one or more activities, such as distributed backup, file sharing, distributed computation initiatives (e.g., the Search for Extra-Terrestrial Intelligence (SETI) project), etc. In other embodiments, P2P collaboration on a particular type of function or service may be limited to, for example, computer systems owned and managed by a single corporation, and only devices that can establish their identity in accordance with a particular authentication mechanism implemented by the corporation may be allowed to participate in P2P activities.

In one embodiment, each physical site of the P2P cloud participating in distributed backup may include at least one backup manager 110; for example, a particular device such as a computer server or a network-attached storage (NAS) device at a given site may be selected or set up as a backup manager 110 based on properties such as high availability, reliable connectivity to the P2P network over a high-bandwidth connection, processing power and/or storage capacity, etc. In such an embodiment, each backup client 130 may be capable of connecting at least temporarily to a backup manager 110 at the site at which the backup client is currently located, e.g., via a Local Area Network (LAN), allowing relatively fast and reliable data communications between the backup clients and the backup managers at a given site. In FIG. 1, for example, backup clients 130A-1-130A-N as well as 130A-P may be linked to backup manager 110A at a local site, backup client 130B-1 may be linked locally to backup managers 110B and 110D, backup clients 130C-1-130C-M may be located at the same site as backup manager 110C, and so on. Backup managers 110 as well as backup clients 130 may include respective components or modules of backup software configured to cooperate to implement the distributed backup mechanism. It is noted that a backup manager 120 may be incorporated in some embodiments within a firewall device, a gateway, a router, or within another device configured to implement security and/or routing-related services.

Each backup manager 110 may have access to a respective storage pool 120 (e.g., backup manager 110A has access to storage pool 120A, backup manager 110B has access to storage pool 120B, and so on) to be dynamically distributed or shared between local backup data and P2P backup data as needed, as described below in further detail. The technique may be more space efficient and/or more time efficient, compared to conventional backup methods, in various embodiments. For example, in some embodiments the amount of backup data that has to be transmitted from the backup clients 130 may be reduced, compared to conventional P2P backup mechanisms and even compared to traditional local backups, thus reducing the time taken for backup as viewed from the clients' perspective as well as the aggregated storage space used for backups from multiple clients. In one embodiment, the backup protocol may ensure that data from each backup client 130 is quickly backed up locally (e.g., to a local backup manager 110) and eventually backed up into the P2P cloud, but may not require that a given client 130 remain connected to the P2P network until its backup to the P2P cloud is complete. In fact, the advantages of P2P backup may be achieved for a given backup client 130 in some embodiments without requiring the backup client to be connected to the P2P network at all, as long as the given client 130 can connect to a local backup manager 110. In FIG. 1, for example, backup client 130A-P may not require direct access to the P2P network to participate in the efficient backup protocol, as long as it can access local backup manager 110A long enough to complete a first, local phase of backup; the backup manager 110A may complete the distribution of backup client 130A-P's data into the P2P network. It is noted that although backup managers and their corresponding backup clients have been described as being located within a given site of the P2P network in the description of some embodiments above, physical proximity may not be required for a device to perform backup manager functionality for a given backup client 130 in other embodiments. As long as the given backup client 130 can connect to a particular device capable of performing backup manager functionality on behalf of the given backup client 130, the particular device and the given backup client 130 may collaborate to implement the efficient backup protocol, even if the backup client 130 and the particular device serving as the backup manager are in physically remote locations.

A particular backup manager 110 that is responsible for implementing the backup protocol for a given backup client 130 may be termed the "designated" or "controlling" backup manager for the given backup client 130. As part of the backup protocol, the designated backup manager 110 for a given backup client 130 may be configured to generate an encrypted and/or redundancy-encoded version of a data object to be backed up from the client in some embodiments. The term "redundancy encoding", as used herein, generally refers to any of a variety of techniques whereby a plurality of data blocks are generated from the original blocks of a data object, such that the data object is recoverable from a subset of the plurality of data blocks. The data object may thus be fully restored even if some of the generated plurality of data blocks are lost. The plurality of the data blocks may be referred to herein as a "redundancy-encoded version" of the original data object. Redundancy encoding techniques may include, for example, using erasure coding or any other desired error-correcting algorithms, replicating portions or all of a data object, etc. In some embodiments, the designated backup manager for a given backup client may change over time: e.g., each time that a request to back up a source data set (comprising a plurality of data objects such as files, directories, etc.) of the backup client is generated, a backup manager for that request may be selected, and different devices may at least in principle be selected to perform the backup manager role for different backup requests. In other embodiments, each backup client 130 may be allotted a particular backup manager device 110, and the same backup manager 110 may be used (as long as it remains operational) for all the backups originating from a given backup client 130. It is noted that a backup manager 110 may itself function as a backup client 130 from time to time in some embodiments. For example, in FIG. 1, backup manager 110D may serve as a backup manager in response to receiving a request to back up data originating at backup manager 110B (i.e., data that was generated or stored directly at backup manager 110B and did not arrive at backup manager 110B as part of another backup initiated from any other device), as well as in response to requests for backing up data originating at backup client 110B-1.

In some implementations, backup managers 110 may be selected from among highly available and highly connected pre-existing devices of the P2P network, while in other implementations highly available dedicated devices (such as NAS appliances or computer servers) may be added to the P2P network specifically to serve as backup managers. The backup managers and their storage pools may have a high-enough availability in some implementations that the level of redundancy required for P2P backups of the client data may be reduced: e.g., fewer copies of a given data block may have to replicated in the P2P network, since the backup managers and storage pools at which the data block is replicated may have a substantially higher availability than the average availability of devices in the P2P cloud as a whole. By ensuring that only highly available devices are selected as backup managers, the storage overhead typically associated with P2P backups may thereby be further reduced in such implementations. In some embodiments, a plurality of different types of hardware and software components of backup managers 110 and their storage pools may each be configured or selected for high availability: e.g., processors, memory, disk devices, etc. of the backup managers 110 may each provide higher-than-average availability and reliability with respect to similar components at the other devices of the P2P network.

It is noted that in addition to implementing the distributed backup technique, backup managers 110 as well as some or all of the backup clients 130 may also be configured to implement various more general P2P storage management functions in different embodiments. Such functions may include, for example, searching for requested data objects (such as files) in the P2P cloud, checking that enough replicas or redundancy-encoded versions of a data object's blocks remain in the P2P cloud so that the data object can survive a specified number of failures of peer devices, adding additional replicas or redundancy-encoded versions of data objects to the P2P cloud if needed, and deleting previously uploaded P2P versions of data objects from the cloud, based on various P2P storage management algorithms and policies. (The check to determine that enough replicas or redundancy-encoded versions of the data object remain may be termed a check for a desired "redundancy level" of the data object.) Thus, the backup managers 110 and/or backup clients 130 in such embodiments may comprise a full-featured P2P storage management software stack. Some or all of the specific techniques and algorithms used for P2P storage management may be configurable in various embodiments, e.g., based on specific policies and parameters agreed to by the participating devices and/or specified by users.

Figure 2:
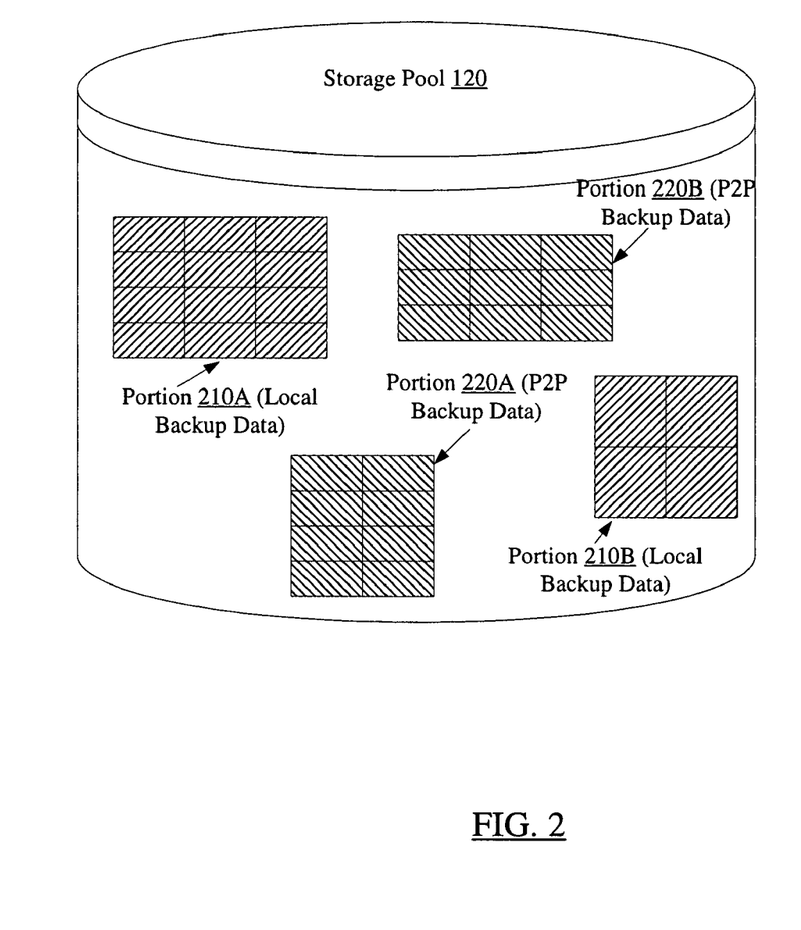
FIG. 2 is a block diagram illustrating an exemplary storage pool accessible to a backup manager for storing backup data, according to one embodiment.

FIG. 2 is a block diagram illustrating an exemplary storage pool 120 accessible to a backup manager 110 for storing backup data, according to one embodiment. The backup manager 110 may be configured to dynamically distribute storage of the pool into respective portions for P2P backup data (e.g., portions 220A and 220B in FIG. 2, collectively referred to herein as portions 220) and for local backup data (e.g., portions 210A and 210B in FIG. 2, collectively referred to herein as portions 210). The term "local backup data" may be used herein to describe data that is backed up from a backup client 130 to its designated backup manager 110 in a first phase of the backup protocol, without using P2P algorithms. In some embodiments, for example, the first phase may comprise the client backup device 130 (or a user at the client backup device 130) specifying a source data set, and backup software at the client and/or at a designated backup manager 110 copying some or all of the source data set to a portion 210 of a storage pool 120 accessible from the designated backup manager. Typical operations performed in P2P algorithms, such as identification of a plurality of peer devices to which data has to be uploaded, encryption and redundancy encoding etc. may not be performed in the first, local phase of the protocol.

In one embodiment, the designated backup manager 110 may be configured to determine, prior to copying the data to a portion 210 of the storage pool 120, whether a backup version of one or more objects of the source data set is already accessible in the P2P cloud, and/or in another portion of the storage pool 120. If an object is already present in the P2P network or the storage pool, it may be excluded from the set of data copied to the storage pool 120 on behalf of the requesting client, thus reducing both the upload bandwidth required at the client and the storage required for the local backup. For example, a user of a client device 130 (e.g., a laptop) running an operating system such as a version of Microsoft Windows™ may request that the entire "C:\" drive be backed up. In response, the designated backup manager 110 may identify a list of files that are to be backed up, and check whether any of the files on the list are already available (e.g., for potential restoration to the requesting backup client device 130) from the P2P cloud and/or other portions of the storage pool 120. The list of files to be backed up may be provided by the client device, or may be obtained directly by the designated backup manager. If one or more files (e.g., operating system files, application binaries, etc., such as some files typically found in "Windows" or "Program Files" folders in most Windows™-based computers) are already available for restoration, the backup manager 110 may only copy the remaining files (i.e., the files not already available from the P2P cloud or the storage pool) to a portion 210 of its storage pool 120. Blocks of data within storage pool 120 that were being used for P2P backup data (or for local backup data for another client) may be reclaimed and retargeted for storing the files copied from the current client.

In some embodiments, a data object may be excluded from the local backup data set only if it is already restorable from one or more remote devices of the P2P network; that is, the presence of a copy of a data object of the source data set in another portion of the storage pool at the designated backup manager 110 may not be sufficient to exclude the object in such embodiments. In one implementation, the backup manager 120 may cache or store metadata indicating where backup versions of the files of the source data set that were not copied may be obtained for restoration, e.g., in order to avoid having to search the P2P network when and if restoration of the source data set is needed. Such metadata may be cached at the backup manager 110 itself, at one or more other devices of the P2P cloud, and/or at the requesting backup client 130 in various embodiments. It is noted that even though encryption and/or redundancy encoding may not be required during the first phase of the backup technique, in some implementations either encryption and/or redundancy techniques may be employed even in the first phase, e.g., if the network path between the backup client device 130 and the designated backup manager 110 is not secure or is not highly available. In some embodiments, e.g., where some types of client devices have limited connectivity even to their designated backup manager, the first phase of the backup may be divided into two or more sessions, so that the client is not forced to remain connected to the designated backup manager for long periods of time. Incremental backup techniques may be implemented during the first phase in some embodiments, e.g., where only modifications made to data objects since a previous backup are copied to the designated backup manager; in other embodiments, full backups may be performed during the first phase. A combination of full backups followed by a series of incremental backups may be performed during first phase backups for a given client over time in some embodiments: e.g., full backups may be performed weekly, and incremental backups may be performed each day in which a full backup is not performed.

The local backup data stored in portions 210 of the storage pool may be prepared for uploading into the P2P cloud, e.g., by encrypting and/or redundancy encoding the local backup data, by the designated backup manager for the backup client 130 in some embodiments. A P2P version of the local backup data (e.g., a version that has been encrypted and/or redundancy encoded) may then be uploaded, e.g., to peer backup managers 110 in the P2P cloud, in a second phase of the backup protocol in such embodiments. In some implementations, the second phase may be asynchronous with respect to the first phase: e.g., there may be a delay between the completion of local copying of the source data set to storage pool 120 and the initiation of preparation and/or uploading of the data to other backup managers of the P2P cloud. In some embodiments, the client device 130 may be notified when the second phase of the backup is completed, thus indicating that the client's data has been successfully uploaded into the P2P cloud (and can be recovered even if, for example, the designated backup manager 110 fails). In other embodiments, notifications may be provided to the client 130 at the end of each phase. In one implementation, the first and second phases may at least partly overlap in time: e.g., as soon as the initial blocks of local backup data are received, they may be prepared for uploading and then uploaded into the P2P cloud, without waiting for the local backup phase to complete. Furthermore, one or more data blocks used to store the local backup data may be reallocated for other purposes before the P2P backup of the entire local backup data is completed in some implementations: e.g., as soon as a P2P version of a particular file is uploaded into the P2P cloud, the data blocks used to store the file in the storage pool 120 may become candidates for reuse or reallocation. In some implementations, the second phase may be performed at a low priority relative to the first phase, or as a background task at the designated backup manager 110. In one embodiment, multiple threads of execution of the backup manager 110 may be configured to prepare and/or transmit respective subsets of the P2P backup version in parallel. In some embodiments, at least a portion of the P2P version of the client's backup data may be stored temporarily within the storage pool: e.g., a portion of the storage pool may serve as a temporary buffer in which the P2P version is stored prior to being uploaded. In other embodiments, the P2P version may be prepared in volatile memory (e.g., a main memory of a buffer manager 120) and uploaded directly from the main memory without being stored locally in persistent storage.

In one embodiment, the designated backup manager 110 may be configured to prepare and/or upload P2P versions of the locally backed up data objects in a particular order—e.g., the backup client 130 may designate some folders/directories or files as being more important than others (or the backup manager may itself use a heuristic or configuration parameters to determine an order in which files should be uploaded), and the files may be uploaded into the P2P cloud in accordance with the specified or determined ordering. To increase the overall availability of the P2P version of the backup data, the P2P version of a given client's backup data may be distributed among a plurality of peer backup managers 110 in some embodiments: e.g., of N data blocks corresponding to the P2P version, (N/5) data blocks may be transmitted to each of five peer backup managers 110 in some embodiments. The target backup managers may be selected based on a number of factors in different embodiments, such as high availability and connectivity, location, or based on the content of the data to be backed up (e.g., a hash function performed on the name of a given object may be used to determine where its backup versions will be stored). A peer backup manager 110 that receives one or more uploaded data blocks corresponding to the P2P version may store them in a P2P portion 220 of its own storage pool 120. Similarly, the designated backup manager 110 for a given backup client 130 may use P2P portions 220 of its storage pool to store incoming data blocks of P2P versions of client backup data injected into the P2P cloud by other backup managers 110. To store the incoming P2P backup data from a particular peer device, a backup manager may reclaim and reuse storage holding local backup data and/or P2P backup data for another peer device as needed.

A variety of different types of physical and/or virtual storage devices may be used for storage pool 120 in different embodiments. For example, in one embodiment, a storage pool 120 may comprise a collection of disk arrays. In other embodiments, the storage pool may comprise individual directly attached disks, network-attached storage (NAS), and/or devices accessible to the backup manager 110 via a Storage Area Network (SAN). The storage pool may include tape devices, optical media, and/or solid state devices such as flash memory devices, in addition to or instead of disk devices in various embodiments. Physical storage corresponding to the storage pool may be organized into virtual storage devices using any desired virtualization technique or combination of virtualization techniques, such as by striping, mirroring, virtual RAID, volume management, file systems, object storage management systems, etc. in some devices. The storage within a given storage pool 120 may be managed as a set of uniformly-sized data blocks in some implementations, while in other implementations variable-length blocks, extents, and/or other units of storage may be used.

In various embodiments, a backup manager 110 may be configured to dynamically allocate and reallocate storage of the storage pool as needed among portions currently designated for P2P backup data and portions currently designated for local backup data. In one exemplary scenario, for example, in response to a request to back up 40 Gigabytes of data from a particular backup client 130, the designated backup manager 110 for that client may initially allocate 40 Gigabytes of storage from its storage pool. As the client's data gets backed up into the P2P cloud, and as incoming P2P backup data is received from other devices in the P2P network, the designated backup manager may reclaim storage from that 40 Gigabyte portion, and use it for the received data. In addition, portions of the initially allocated 40 Gigabytes may also be re-used for local backup data received from other clients. Eventually, in this exemplary scenario, it may be possible that all 40 Gigabytes of storage initially allocated for the particular backup client are reallocated for other purposes by the designated backup manager 110. Similarly, in response to local backup data received from another client, the designated backup manager may reclaim and reallocate data from a P2P portion 220 of the storage pool as needed in some embodiments. The backup manager 110 may be allowed substantial flexibility in determining how specific data blocks of the storage pool 120 are to be used in some embodiments, as long as any guarantees provided by the backup manager to its clients and/or peers are not violated. For example, in one embodiment, the designated backup manager 110 may guarantee to a backup client 130 that after the first phase of backup has been completed for a particular source data set, it will be possible to recover any of the data objects included in the source data set. In such an embodiment, the designated backup manager may be required to ensure that for any given data object of the source data set, at least one backup version exists, either in the storage pool managed by the designated backup manager (e.g., in a portion 210 dedicated to local backup data) or in the P2P cloud. Thus, before reallocating a data block that currently stores local backup data for the client, the designated backup manager 110 may be configured to verify that the data object corresponding to that data block is recoverable from one or more peer devices in the P2P network in such an embodiment. In some embodiments, deletion policies may be specified for the backup manager 110 (e.g., via input parameters) to govern how and when data is to be deleted from local backups and/or from the P2P network. For example, a data object may be deleted from a portion of the storage pool storing local backup data when a desired minimum redundancy level specified in a parameter is attained. In some embodiments, a backup manager may be configured to retain a local backup of a client's data set (or one or more snapshots of a client's data set) for a specified period of time (e.g., a week), independently of whether the P2P version has been uploaded or not. In typical environments where most restore operations are requested fairly close to the time that the corresponding data is backed up, such a retention policy may help to support efficient restores from local backups during the retention period.

In some embodiments, at least a specified amount of storage in storage pool 120 may be reserved for local backup data, and at least another specified amount of storage in the storage pool 120 may be reserved for P2P backup data, e.g., to reduce delays that might otherwise occur in response to backup requests from local clients or peer devices. In one embodiment, the designated backup manager 110 may be configured to maintain a local backup version of a particular client's data set in its storage pool 120 (i.e., to prevent local backup data for the particular client from being overwritten in the storage pool), and also to upload a P2P backup version of the particular client's data set. In some embodiments, backup clients 130 may be permitted to specify whether they want only local backups, or whether they also want P2P backups of their data sets, and their designated backup manager 120 may be configured to provide the requested level of backup support. In some implementations, a backup manager 120 may upload P2P backup data to devices that are not themselves configured as backup managers: e.g., P2P backup data may be uploaded to a remote client device 130 in such embodiments.

Figure 3:
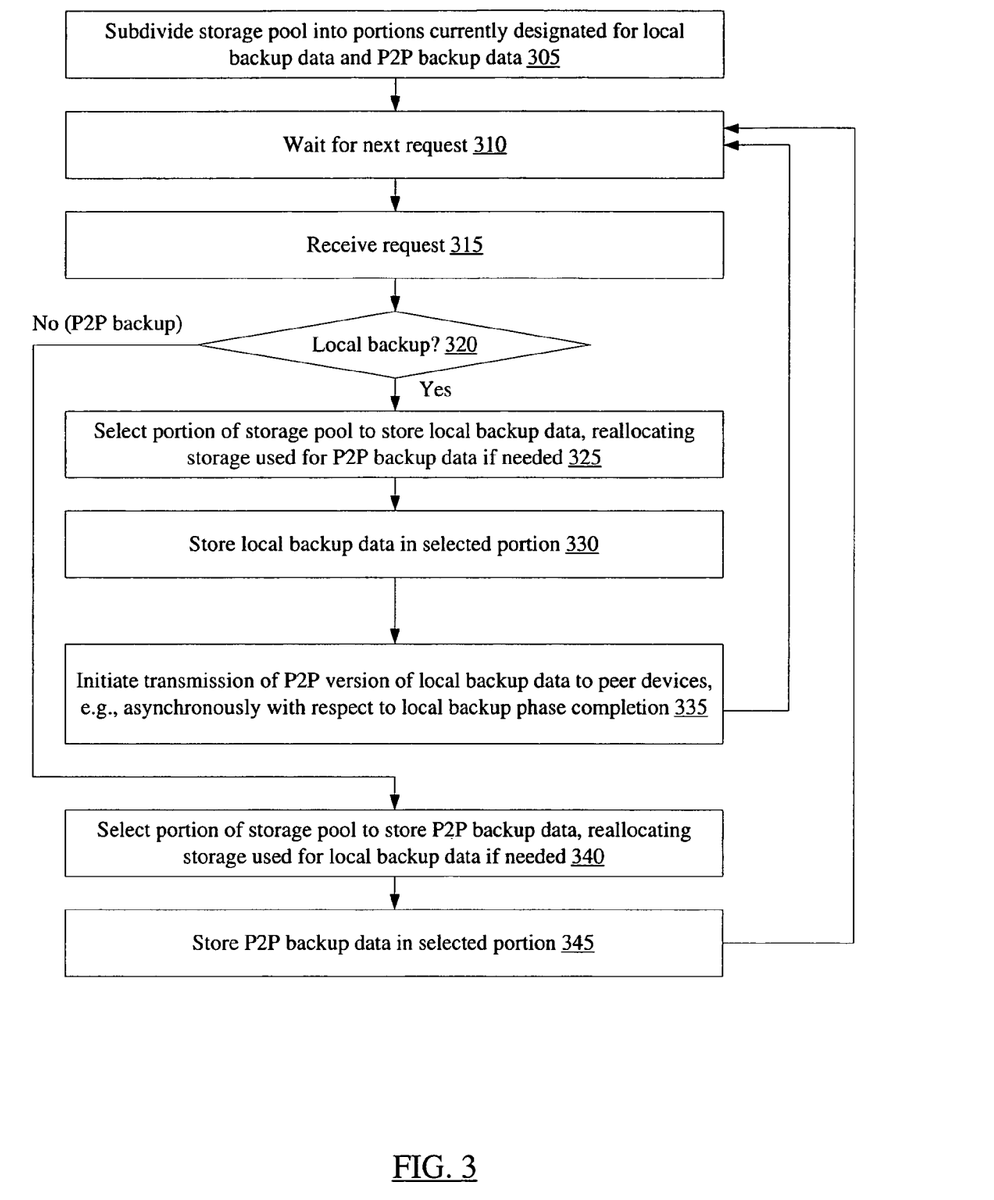
FIG. 3 is a flow diagram illustrating aspects of the operation of a backup manager, according to one embodiment.

FIG. 3 is a flow diagram illustrating aspects of the operation of a backup manager 110, according to one embodiment. As illustrated in block 305, the backup manager 110 may be configured to dynamically subdivide a storage pool 120 into portions designated for storing local backup data received directly from backup clients 130 and portions designated to store P2P backup data received from peer devices in the P2P cloud. In some embodiments, the storage pool may be initially divided into one or more portions for local backup data and one or more portions for P2P backup data, e.g., when the backup manager 110 is started up or initialized. After initialization, the backup manager 110 may be configured to wait for backup-related requests (block 310), including requests from locally-connected clients 130 and requests from peer devices. When the next request is received (block 315), if it is a request from a backup client 130 to store local backup data (as determined in block 320), the backup manager may be configured to select a portion 210 of the storage pool 120 to store the local backup data, reallocating storage currently being used for P2P backup data if needed (block 325). The local backup data may be stored in the selected portion 210 of the storage pool (block 330). The backup manager 110 may then be configured to initiate a second phase of the backup on behalf of the client 130, in which, for example, a P2P version of the local backup data is generated by encrypting and/or redundancy encoding the local backup data. The P2P version may then be uploaded into the P2P cloud, e.g., to a number of selected devices such as other backup managers 110 and/or other client devices 130 (block 335). In some embodiments, the second phase may be performed asynchronously with respect to the first phase. It is noted that in some embodiments, the P2P version of the local backup data for at least one client 130 may be identical to the local version—e.g., neither encryption nor redundancy encoding may be performed in such embodiments, and the data blocks that were copied from the backup clients may be transmitted without modification into the P2P network.

If the next request received by the backup manager 110 is a request from a peer device to store P2P backup data (as also determined in block 320 of FIG. 3), the backup manager 110 may select a portion 220 of the storage pool 120 in which the P2P backup data is to be stored, potentially reallocating storage currently used for local backup data if needed (block 340). The backup manager 110 may store the incoming P2P backup data in the selected portion of the storage pool (block 345), and then wait for the next request (block 310). The processing of subsequent requests may lead to further iterations of operations corresponding to blocks 315-345.

It is noted that while operations corresponding to two types of requests are illustrated in FIG. 3, (i.e., requests to store local backup data and requests to store P2P backup data), backup manager 110 may also receive and process a variety of other types of requests and/or notifications in various embodiments. For example, the backup manager 110 may receive restore requests for data objects, either from a locally-connected backup client 130 or from a peer device such as another backup manager 110. In response to a restore request, the backup manager 110 may be configured to determine whether the requested data object is available from its storage pool 120. If the requested object is present in the storage pool, it may be transmitted to the requester. Otherwise, the backup manager 110 may be configured to determine, using any of a variety of search mechanisms supported in the P2P network, whether any other peer devices in the P2P network currently store the requested object. If such peer devices are found, the backup manager 110 may redirect the request to the peer devices or send an identification of the peer devices to the requester. In some embodiments, a backup manager 110 may also be configured to receive configuration change notifications, e.g., indicating that a particular peer device is no longer available or no longer participating in the backup protocol. In response to such a notification, the backup manager may be configured in some embodiments to identify other peer devices that may be willing to store P2P backup versions of local backup data for one or more of its backup clients 130, e.g., to ensure that a minimum desired level of redundancy is maintained for each backup client's data. In one embodiment, a backup manager 110 may be configured to determine, e.g., via P2P search requests or P2P verification requests, whether enough peer devices still provide access to a valid version of a data object that was previously uploaded from the backup manager. Various techniques may be used to implement such searches and verifications in different embodiments, e.g., a partial hash request may be sent to a peer device to obtain hash values derived from sub-portions of a data object stored at the peer device, and the hash values may be used to determine whether the data object is still valid or has been corrupted.

In one embodiment, in response to a particular request or notification, the backup manager 110 may be configured to re-assemble backup data that was earlier dispersed into the P2P cloud from the backup manager. For example, in one scenario a user may notify the backup manager 110 that a disk at a particular backup client 130 for which the backup manager is the designated backup manager has failed. In response to the notification, the backup manager may be configured to determine whether all the data of the failed disk is currently backed up within its storage pool 120. If the data corresponding to the failed disk is no longer fully recoverable from the local storage pool 120 (e.g., because some of the storage originally used to store the data was later reallocated for other purposes by the backup manager), the backup manager 110 may be configured to retrieve the missing data from the P2P cloud. In the exemplary scenario, when a replacement disk is brought on-line, it may be rapidly restored (e.g., via a LAN linking the backup manager 110 to the client device whose disk is replaced) instead of relying on potentially slow recovery from remote peer devices.

Figure 4:
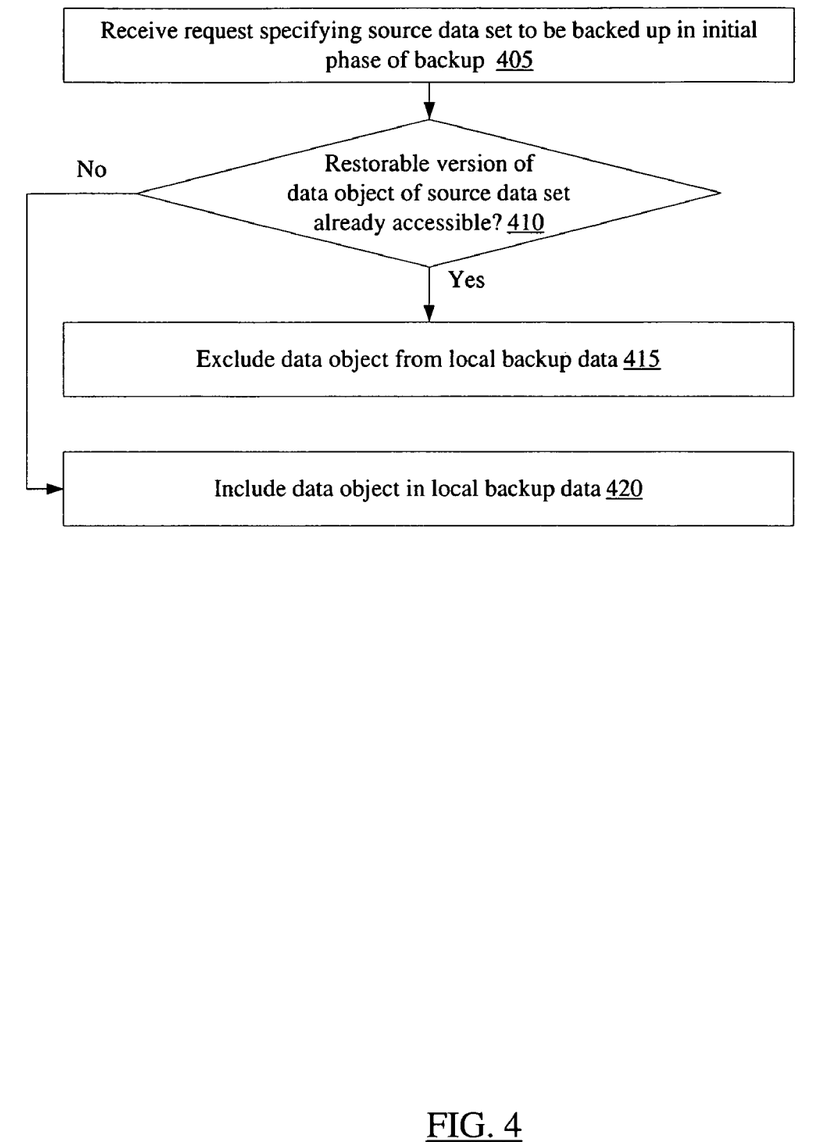
FIG. 4 a flow diagram illustrating aspects of the operation of a backup manager, according to one embodiment in which the backup manager is configured to attempt to reduce the total amount of data that has to be transmitted from a given client device for backup.

As noted earlier, in some embodiments, a backup manager 110 may be configured to attempt to reduce the total amount of data that has to be transmitted from a given client device 130 for backup. FIG. 4 is a flow diagram illustrating aspects of the operation of a backup manager 110 according to one such embodiment. As shown in block 405, the backup manager 110 may receive a request from a backup client 130 to back up a specified source data set, such as, for example, a disk drive in (e.g., "C:\" in a Windows™ environment), a file system, one or more logical volumes, a set of named directories and/or files, etc. The source data set may comprise actual names of data objects in some implementations, or may be identified indirectly, e.g., using regular expressions with wildcards, exclusion indicators, etc. In one embodiment, a condition-based specification of the objects to be backed up may be provided by the client 130: e.g., "back up all the photographs stored in the "My Photos" directory since Jan. 21, 2005", and backup manager 110 may be configured to enumerate a list of the specific objects to be backed up. It is noted that in some embodiments, the requester may not be aware of the details (e.g., multiple phases) of the backup protocol that will be used to implement the backup, and may not even be aware that a P2P network is being used for the backup. In one such embodiment, for example, a simple interface may be supplied to a user of a client device 130, in which objects to be backed up (or restored) may be identified or specified indirectly; the details of the backup may be handled transparently by backup management software at the client, the designated backup manager 110, and the P2P network.

In response to the backup request specifying the source data set, the backup manager 110 may be configured to determine whether one or more data objects of the source data set are already accessible for restoration (block 410 of FIG. 4), e.g., from a remote peer device and/or from the local storage pool 120. If a restorable version of the particular data object, such as a file, is already accessible, the object may be excluded from the set of data backed up in response to the request (block 415); otherwise, the data object may be included in the set of data that is backed up (block 420). Any of a variety of techniques may be used to determine whether the data object is already accessible in various embodiments. For example, in one embodiment, checksums or fingerprints computed from the contents of the data object may be used to verify that an object stored at a peer device is identical to the data object in the set of data to be backed up from the client.

Backup manager 110 may in some embodiments maintain lists of objects that are likely to be present in source data sets and are known to be present in the P2P network, such as various operating system files, binaries and/or support files for commonly-used applications, image files (such as desktop icons), message catalog files, etc., and may use such pre-assembled lists to more efficiently determine whether the amount of data to be backed up from a given client may be reduced. In some implementations, in addition to file or object names, unique identifications for the objects such as checksums or fingerprints may also be cached by the backup manager 110. In one embodiment, the backup manager may check separately, for each phase of the backup, whether the amount of data to be transmitted may be reduced. For example, for the first phase, the backup manager may check whether its storage pool already includes any of the data objects for which backup is being requested, and if not, whether the P2P network already includes any of the data objects. If the second phase (including the P2P upload) is performed asynchronously with respect to the first phase, a second check may be performed prior to the upload. In some embodiments, a limited search of the P2P network may be performed for the first phase (e.g., a time-limited search may be performed, or only a small subset of the P2P network may be searched), and a more thorough check may be performed prior to the uploading step. In some embodiments, backup manager 110 may be configured to use difference storage techniques for local and/or P2P backup phases: e.g., if only a small change is detected from a previously backed up version of a data object, only the difference may be stored, together with a pointer to the original backed-up version. Any of a variety of techniques for determining differences between data objects, such as various redundancy elimination algorithms, may be used in such embodiments. Such difference-based techniques may help to reduce the total amount of storage needed for backup substantially in some embodiments.

Figure 5:
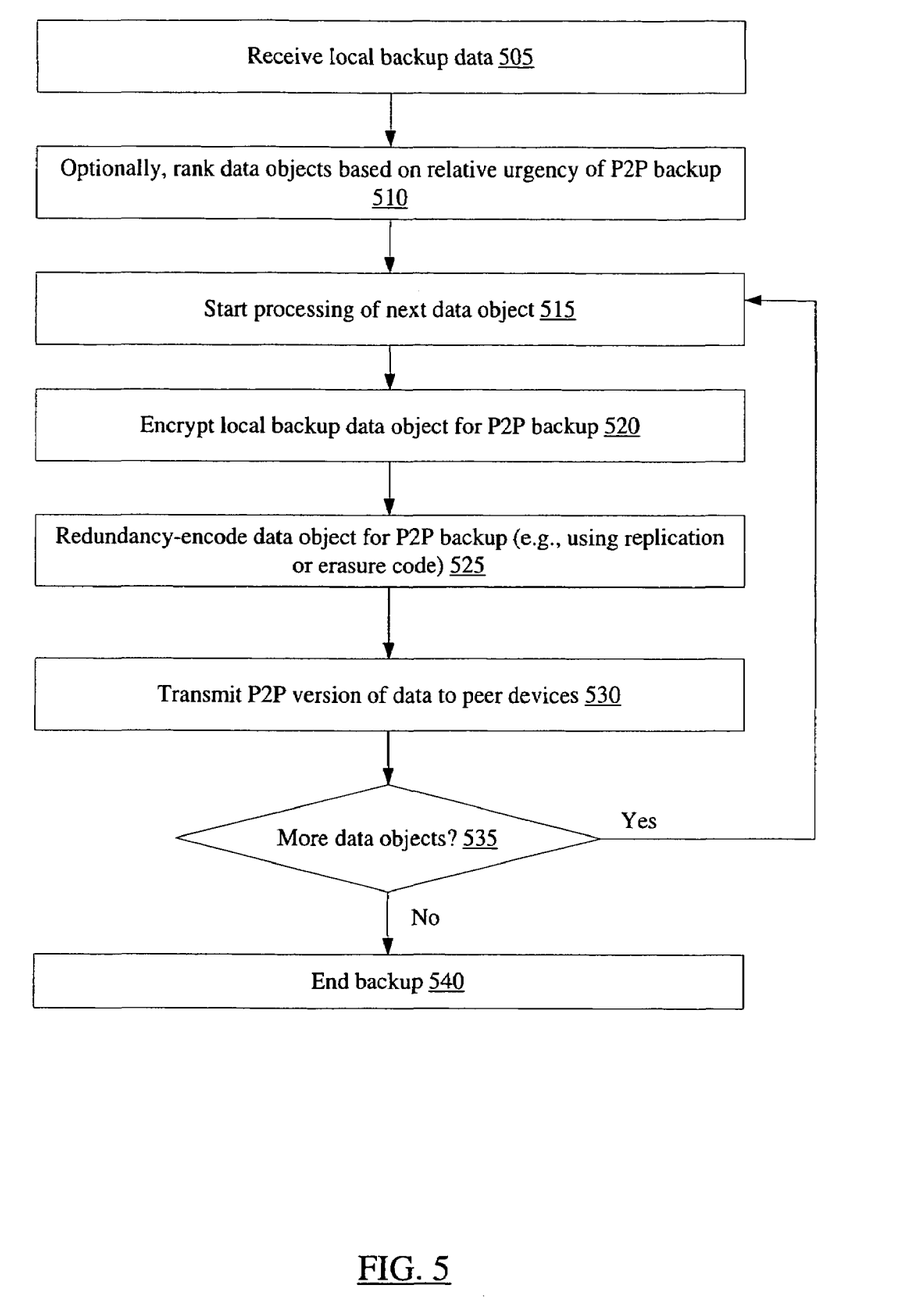
FIG. 5 is a flow diagram illustrating aspects of the operation of a backup manager after it receives local backup data from a backup client, according to one embodiment.

FIG. 5 is a flow diagram illustrating aspects of the operation of a backup manager 110 after it receives local backup data from a backup client 130, according to one embodiment. After the local backup data is received (block 505), the objects included in the local backup data may optionally be ranked, e.g., in order of a relative urgency of the P2P backup of the objects (block 510). The ranking may be based on information provided by the backup client 130 in some embodiments—e.g., the client may indicate which folders or files are the most "irreplaceable" in the event of a failure or disaster, and the specified folders or files may be ranked highest in priority for P2P uploading. In other embodiments, the ranking may be performed by the backup manager 110 without explicit guidance from the client 130—e.g., based on assumptions about where the most critical data is usually stored in a personal computer (e.g., "My Documents"), based on how recently or by whom various data objects were updated, based on file types or file extensions, or based on any combination of these and other factors.

The processing for P2P uploading of the next data object of the local backup data set may then be initiated (block 515). In implementations where the data objects are ranked as described above, the data object may be selected based on the ranking. In one embodiment, the data object may be encrypted (block 520) and redundancy encoded (block 525) before being transmitted to one or more selected peer devices (block 530) of the P2P network. It is noted that in some embodiments, only encryption may be performed, without redundancy encoding; while in other embodiments, only redundancy encoding may be performed, without encryption. The target peer devices (e.g., one or more backup managers 110 and/or one or more remote backup client devices 130) may be selected based on a variety of factors, such as an estimated availability, a physical location (e.g., peer devices in a different city may be preferred to devices in the same city in order to increase the likelihood of recovery from natural disasters), etc. If more data objects remain (as detected in block 535 of FIG. 5), the next object may be selected for P2P processing, and the operations corresponding to blocks 520, 525 and 530 may be repeated for the next object. When all the data objects have been uploaded into the P2P cloud, the backup is completed (block 540). It is noted that in various embodiments, at least some of the operations depicted in FIG. 5 may be performed in parallel, or in a different order than shown. For example, in one embodiment, multiple threads of execution within the designated backup manager may be configured to generate and/or upload different subsets of the P2P version of the client's data into the P2P cloud in parallel.

Figure 6:
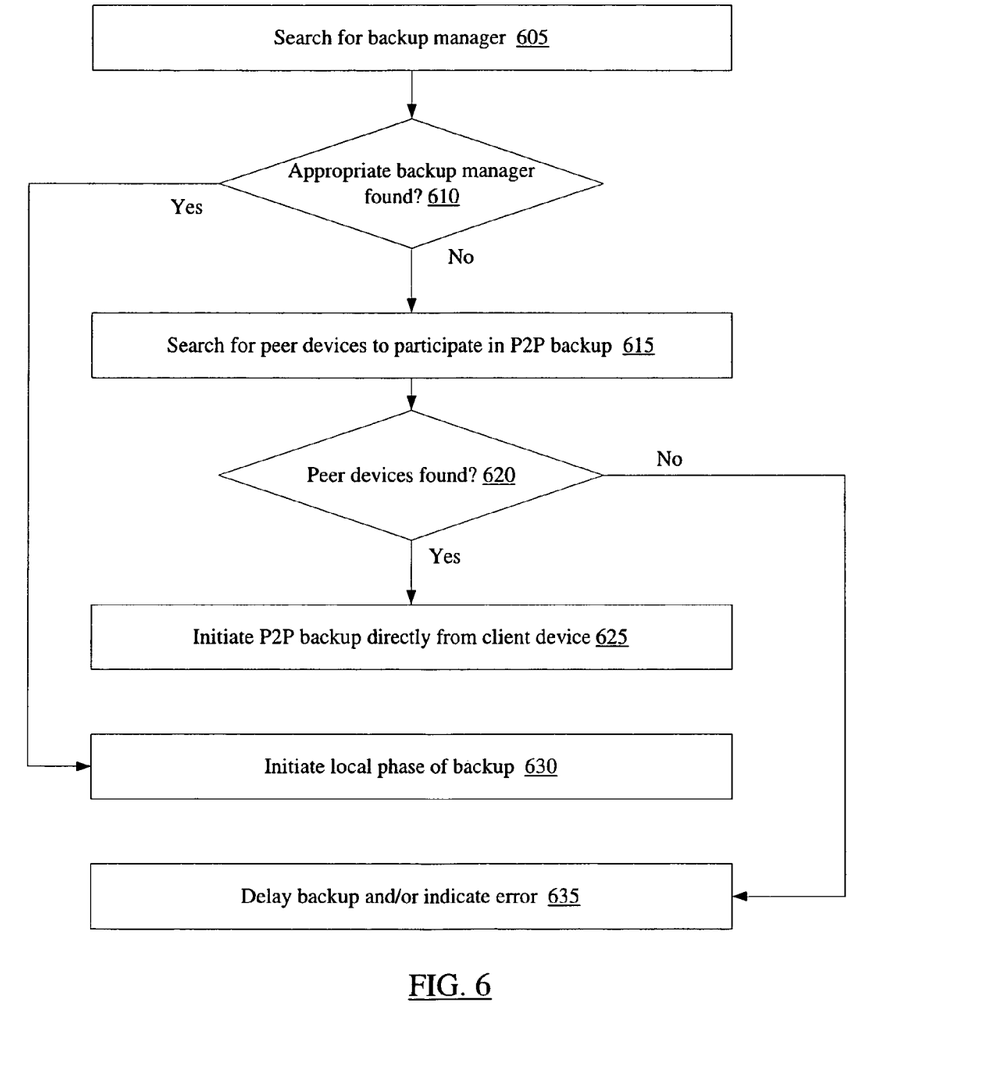
FIG. 6 is a flow diagram illustrating aspects of the operation of a backup client device configured to dynamically search for a backup manager when a backup from the client device is to be initiated, according to one embodiment.

In some embodiments, backup software installed at a client device 130 may be configured to dynamically search for a backup manager 110 when a backup from the client is to be initiated. FIG. 6 is a flow diagram illustrating aspects of the operation of the backup client device 130 in one such embodiment. As shown, the backup client 130 may be configured to initiate a search for a backup manager (block 605), e.g., for a backup manager with a desired set of availability and connectivity characteristics, to implement a distributed backup of the client's data set. In some embodiments, devices configured to act as backup managers may advertise themselves as such, and may also provide additional information to clients, such as the current size and/or utilization level of their storage pool 120, an indication of how busy they currently are processing other client backups, etc. In one embodiment, for example, a given backup client 130 may have direct or local access to a plurality of backup managers 110 (e.g., in FIG. 1, backup client 130B-1 may have access to backup managers 110B and 110D), and may be configured to select a particular one of the backup managers (or a collection of backup managers) to handle its current backup request based on which one of the backup managers currently has the lowest utilization levels or the highest available storage space. If an appropriate backup manager is found (as determined in block 610), the local phase of backup may be initiated (block 630) with the backup manager, and remaining operations of the backup described above, such as the preparation of the P2P version of the local backup data and the dissemination of the P2P version of the data may be performed by the selected backup manager.

In some embodiments, it may be possible that the client device 130 is unable to find a device with the required characteristics to serve as its designated backup manager. In such a case (as also detected in block 610), in one embodiment the client device 130 may be configured to initiate P2P backup without the help of a designated backup manager 110. For example, the client device 130 may be configured to search for remote peer devices (such as other backup clients or remote backup managers) that are suitable for receiving a P2P version of its source data set (block 615). If such devices are found (as detected in block 620 of FIG. 6), the client device 130 may initiate a P2P backup to the found peer devices (block 625)—for example, the client device 130 may itself encrypt and/or redundancy encode its source data and upload the data to the target peer devices. If the client can find neither a suitable backup manager 110 nor peer devices that are willing to participate in a P2P backup with the client, the client may either delay the initiation of backup or generate an error indication (block 635). E.g., if the request to backup was initiated by a user, a message such as "Sorry, no target devices for saving backup data are currently accessible. Please try again later." may be displayed to the user.

Figure 7:
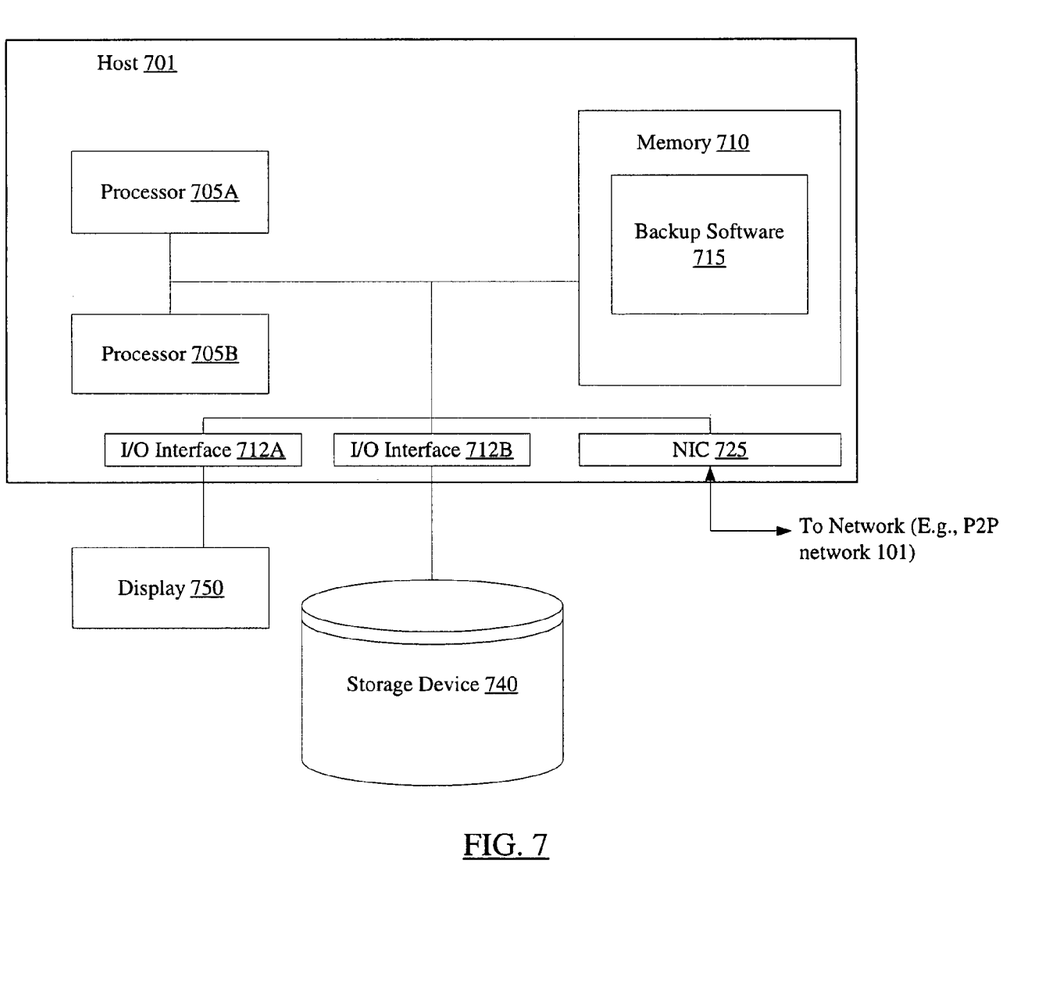
FIG. 7 is a block diagram illustrating constituent elements of a computer host, according to one embodiment.

FIG. 7 is a block diagram of a computer host 701 that may function as a backup manager 110 and/or a backup client 130, according to one embodiment. As shown, host 701 may include one or more processors 705, such as processors 705A and 705B. In various embodiments, processors 705 may be implemented using any desired architecture or chip set, such as the SPARC™ architecture from Sun Microsystems or the x86-compatible architectures from Intel Corporation, Advanced Micro Devices, etc. Backup software 715 comprising program instructions that may be executable to implement the backup techniques described above may be partly or fully resident within a memory 710 at a given point in time, and may also be stored on a storage device 740. Part or all of the storage device 740 may be included within a storage pool 120 in some embodiments. Memory 710 may be implemented using any appropriate medium such as any of various types of RAM (e.g., DRAM, SDRAM, RDRAM, SRAM, etc.). In addition to processors 705 and memory 710, host 701 may also include one or more I/O interfaces 712, such as I/O interface 712A to a display device 750, and I/O interface 712B providing access to storage devices 740, one or more network interface cards (NICs) 725 providing access to a network such as P2P network 101, and the like. Any of a variety of storage devices 740 may be used to store the instructions as well as data for backup software 715 in different embodiments, including any desired type of persistent and/or volatile storage devices, such as individual disks, disk arrays, tape devices, optical devices such as CD-ROMs, CD-RW drives, DVD-ROMs, DVD-RW drives, flash memory devices, holographic media devices, various types of RAM and the like. One or more storage devices 740 may be directly coupled to host 701 in some embodiments (e.g., using the Small Computer Systems Interface (SCSI) protocol), or may be accessible over any desired storage interconnect such as a fiber channel fabric or storage area network (SAN) in other embodiments. In some embodiments, the Internet SCSI (iSCSI) protocol may be used.

In addition to backup software 715, memory 710 and/or storage devices 740 may also store operating systems software and/or software for various applications in various embodiments. In some embodiments, backup software 715 may be included within an operating system, a storage management software product or another software package, while in other embodiments, backup software 715 may be packaged as a standalone product. In some embodiments, the component modules of backup software 715 may be distributed across multiple participating hosts 701 serving as backup managers 110 and backup clients 130, or may be replicated at the participating hosts. In one embodiment, part or all of the functionality of a backup manager 110 or a backup client 130 may be implemented via one or more hardware devices (e.g., via one or more Field Programmable Gate Array (FPGA) devices) or in firmware. It is noted that a backup manager 120 may be incorporated in some embodiments within a network-attached storage (NAS) device, and in other embodiments within a firewall device, a gateway, a router, or within another device configured to implement network security and/or routing-related services. Network 101 and/or the links between client devices 130 and backup managers 120 may be implemented using any of a variety of hardware and software networking technologies in various embodiments, such as TCP/IP (Transmission Control Protocol/Internet Protocol) over Ethernet, Asynchronous Transfer Mode (ATM), Fiber Distributed Data Interface (FDDI), etc. Network 101 may include one or more wired or wireless LANs, MANs (Metropolitan Area Networks), and/or WANs (Wide Area Networks) in some embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
one or more processors;
memory coupled to the one or more processors, wherein the memory stores program instructions executable by the one or more processors to implement a first backup manager configured to:
subdivide a storage pool into one or more portions of storage designated for local backup data and one or more portions of storage designated for peer-to-peer (P2P) backup data;
receive a first request from a first backup client to store first local backup data, wherein the first local backup data includes a first plurality of data blocks;
in response to the first request:

store the first plurality of data blocks of the first local backup data in a first portion of the storage pool designated for local backup data; and transmit at least a portion of a P2P version of the first local backup data to each of one or more backup managers implemented by one or more peer devices of a P2P network;

receive a second request to store second backup data, wherein the second backup data includes a second plurality of data blocks;

store the second backup data in response to the second request, wherein storing the second backup data comprises replacing one or more particular data blocks of the first local backup data with one or more of the data blocks of the second backup data.

2. The system of claim 1, wherein said receiving the second request to store the second backup data comprises receiving a request from a second backup manager to store particular P2P backup data;

wherein said storing the second backup data comprises:
reallocating storage which stores the one or more particular data blocks of the first local backup data from the first portion of the storage pool designated for local backup data to a second portion of the storage pool designated for P2P backup data; and
storing the particular P2P backup data in the second portion of the storage pool.

3. The system of claim 2, wherein the first backup manager is further configured to:

prior to reallocating the storage which stores the one or more particular data blocks of the first local backup data from the first portion of the storage pool to the second portion of the storage pool, determine that the first local backup data is recoverable from one or more additional backup managers implemented by one or more peer devices of the P2P network.

4. The system of claim 2, wherein the first backup manager is configured to reallocate the storage which stores the one or more particular data blocks of the first local backup data from the first portion of the storage pool to the second portion of the storage pool prior to completing a transmission of the at least a portion of the P2P version of the first local backup data to each of the one or more backup managers implemented by the one or more peer backup devices.

5. The system of claim 1, wherein said receiving the second request to store the second backup data comprises receiving a request from a second backup client to store second local backup data;

wherein replacing the one or more particular data blocks of the first local backup data with the one or more of the data blocks of the second backup data comprises replacing the one or more particular data blocks of the first local backup data with one or more data blocks of the second local backup data.

6. The system of claim 1, wherein the first backup manager is further configured to:

receive a third request from a second backup manager to store particular P2P backup data, wherein the particular P2P backup data includes a third plurality of data blocks; and in response to the third request, store the third plurality of data blocks of the particular P2P backup data in a second portion of the storage pool designated for P2P backup data.

7. The system of claim 6, wherein the first backup manager is further configured to:

receive a fourth request to store additional backup data, wherein the additional backup data includes a fourth plurality of data blocks; and store the additional backup data in response to the fourth request, wherein storing the additional backup data comprises replacing one or more particular data blocks of the particular P2P backup data with one or more of the data blocks of the additional backup data.

8. The system of claim 7, wherein receiving the fourth request to store the additional backup data comprises receiving a request to store additional local backup data;

wherein said storing the additional backup data comprises:
reallocating storage which stores the one or more particular data blocks of the particular P2P backup data from the second portion of the storage pool designated for P2P backup data to a third portion of the storage pool designated for local backup data; and
storing the additional local backup data in the third portion of the storage pool.

9. The system of claim 7, wherein the particular P2P backup data is first P2P backup data;

wherein said receiving the fourth request to store the additional backup data comprises receiving a request from a third backup manager to store second P2P backup data;

wherein replacing the one or more particular data blocks of the particular P2P backup data with the one or more of the data blocks of the additional backup data comprises replacing one or more particular data blocks of the first P2P backup data with one or more data blocks of the second P2P backup data.

10. The system of claim 1, wherein receiving the first request from the first backup client to store the first local backup data comprises:

receiving a request from the first backup client to store a source data set;

exclude a data object of the source data set from the first local backup data stored in the first portion of the storage pool in response to determining that a restorable backup version of the data object is already accessible to the first backup manager.

11. The system of claim 10, wherein in determining that the restorable backup version of the data object is already accessible, the first backup manager is configured to determine that the restorable backup version of the data object is accessible from another backup manager implemented by a peer device of the P2P network.

12. The system of claim 1, wherein the first local backup data includes a data object;

wherein the first backup manager is further configured to generate an encrypted version of the data object for inclusion in the P2P version of the first local backup data.

13. The system of claim 1, wherein the first local backup data includes a data object;

wherein the first backup manager is further configured to generate a redundancy-encoded version of the data object for inclusion in the P2P version of the first local backup data.

14. The system of claim 1, wherein the first backup manager is incorporated within a network-attached storage (NAS) device.

15. The system of claim 1, wherein the first backup manager is incorporated within at least one of:
- a network router;
- a gateway;
- a firewall.

16. The system of claim 1,
wherein the first local backup data includes a plurality of data objects;
wherein the backup manager is further configured to assign a rank to each data object of the plurality of data objects;
wherein, to transmit the at least a portion of the P2P version of the first local backup data to each of the one or more backup managers implemented by the one or more peer devices, the first backup manager is further configured to transmit respective P2P versions of the plurality of data objects in a sequence derived at least in part from the respective rank assigned to each data object of the plurality of data objects.

17. A tangible, computer-readable medium storing program instructions executable to implement a first backup manager configured to:
subdivide a storage pool into one or more portions of storage designated for local backup data and one or more portions of storage designated for peer-to-peer (P2P) backup data;
receive a first request from a first backup client to store first local backup data, wherein the first local backup data includes a first plurality of data blocks;
in response to the first request:
store the first plurality of data blocks of the first local backup data in a first portion of the storage pool designated for local backup data; and
transmit at least a portion of a P2P version of the first local backup data to each of one or more backup managers implemented by one or more peer devices of a P2P network;
receive a second request to store second backup data, wherein the second backup data includes a second plurality of data blocks;
store the second backup data in response to the second request, wherein storing the second backup data comprises replacing one or more particular data blocks of the first local backup data with one or more of the data blocks of the second backup data.

18. The computer-readable medium of claim 17,
wherein said receiving the second request to store the second backup data comprises receiving a request from a second backup manager to store particular P2P backup data;
wherein said storing the second backup data comprises:
reallocating storage which stores the one or more particular data blocks of the first local backup data from the first portion of the storage pool designated for local backup data to a second portion of the storage pool designated for P2P backup data; and
storing the particular P2P backup data in the second portion of the storage pool.

19. The computer-readable medium of claim 17,
wherein said receiving the second request to store the second backup data comprises receiving a request from a second backup client to store second local backup data;
wherein replacing the one or more particular data blocks of the first local backup data with the one or more of the data blocks of the second backup data comprises replacing the one or more particular data blocks of the first local backup data with one or more data blocks of the second local backup data.

20. The computer-readable medium of claim 17, wherein the first backup manager is further configured to:
receive a third request from a second backup manager to store particular P2P backup data, wherein the particular P2P backup data includes a third plurality of data blocks; and
in response to the third request, store the third plurality of data blocks of the particular P2P backup data in a second portion of the storage pool designated for P2P backup data.

21. The computer-readable medium of claim 20, wherein the first backup manager is further configured to:
receive a fourth request to store additional backup data, wherein the additional backup data includes a fourth plurality of data blocks; and
store the additional backup data in response to the fourth request, wherein storing the additional backup data comprises replacing one or more particular data blocks of the particular P2P backup data with one or more of the data blocks of the additional backup data.

22. The computer-readable medium of claim 21,
wherein receiving the fourth request to store the additional backup data comprises receiving a request to store additional local backup data;
wherein said storing the additional backup data comprises:
reallocating storage which stores the one or more particular data blocks of the particular P2P backup data from the second portion of the storage pool designated for P2P backup data to a third portion of the storage pool designated for local backup data; and
storing the additional local backup data in the third portion of the storage pool.

23. The computer-readable medium of claim 21,
wherein the particular P2P backup data is first P2P backup data;
wherein said receiving the fourth request to store the additional backup data comprises receiving a request from a third backup manager to store second P2P backup data;
wherein replacing the one or more particular data blocks of the particular P2P backup data with the one or more of the data blocks of the additional backup data comprises replacing one or more particular data blocks of the first P2P backup data with one or more data blocks of the second P2P backup data.

24. A method implemented by a first backup manager executing in a computer system, the method comprising:
subdividing a storage pool into one or more portions of storage designated for local backup data and one or more portions of storage designated for peer-to-peer (P2P) backup data;
receiving a first request from a first backup client to store first local backup data, wherein the first local backup data includes a first plurality of data blocks;
in response to the first request:
storing the first plurality of data blocks of the first local backup data in a first portion of the storage pool designated for local backup data; and
transmitting at least a portion of a P2P version of the first local backup data to each of one or more backup managers implemented by one or more peer devices of a P2P network;
receiving a second request to store second backup data, wherein the second backup data includes a second plurality of data blocks;
storing the second backup data in response to the second request, wherein storing the second backup data comprises replacing one or more particular data blocks of the first local backup data with one or more of the data blocks of the second backup data.

25. The method of claim 24, wherein said receiving the second request to store the second backup data comprises receiving a request from a second backup manager to store particular P2P backup data;

wherein said storing the second backup data comprises:

reallocating storage which stores the one or more particular data blocks of the first local backup data from the first portion of the storage pool designated for local backup data to a second portion of the storage pool designated for P2P backup data; and storing the particular P2P backup data in the second portion of the storage pool.

26. The method of claim 24, wherein said receiving the second request to store the second backup data comprises receiving a request from a second backup client to store second local backup data;

wherein replacing the one or more particular data blocks of the first local backup data with the one or more of the data blocks of the second backup data comprises replacing the one or more particular data blocks of the first local backup data with one or more data blocks of the second local backup data.

* * * * *